United States Patent
Chen et al.

(10) Patent No.: US 11,641,259 B2
(45) Date of Patent: May 2, 2023

(54) ENHANCED SOUNDING REFERENCE SIGNAL RESOURCE ALLOCATION USING A SELECTED REFERENCE RESOURCE

(71) Applicant: QUALCOMM Incorporated, San Diego, CA (US)

(72) Inventors: Yitao Chen, San Diego, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 17/303,178

(22) Filed: May 21, 2021

(65) Prior Publication Data

US 2022/0376869 A1 Nov. 24, 2022

(51) Int. Cl.
*H04L 5/00* (2006.01)
*H04W 72/02* (2009.01)
(Continued)

(52) U.S. Cl.
CPC ....... *H04L 5/0053* (2013.01); *H04W 72/0446* (2013.01); *H04W 72/1268* (2013.01); *H04W 72/23* (2023.01)

(58) Field of Classification Search
CPC ............ H04L 5/0053; H04W 72/0446; H04W 72/1268; H04W 72/1289; H04W 72/23
See application file for complete search history.

(56) References Cited

U.S. PATENT DOCUMENTS

| | | | |
|---|---|---|---|
| 2019/0174466 A1 | 6/2019 | Zhang et al. | |
| 2020/0275474 A1* | 8/2020 | Chen | H04L 1/1607 |
| 2020/0314817 A1* | 10/2020 | Sun | H04L 5/0044 |
| 2021/0184812 A1* | 6/2021 | MolavianJazi | H04L 5/0051 |
| 2021/0367727 A1* | 11/2021 | Go | H04L 5/0048 |
| 2022/0272724 A1* | 8/2022 | Oteri | H04W 72/1263 |

FOREIGN PATENT DOCUMENTS

| | | |
|---|---|---|
| EP | 1020831 A1 | 6/2022 |
| WO | 2021060766 A1 | 4/2021 |

(Continued)

OTHER PUBLICATIONS

CATT: "Discussion on SRS Enhancement for Rel-17", 3GPP Draft, 3GPP TSG RAN WG1 #104-e, R1-2100348, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25-Feb. 5, 2021, Jan. 19, 2021 (Jan. 19, 2021), 17 Pages, XP051970951.

(Continued)

*Primary Examiner* — Diane L Lo
*Assistant Examiner* — Abusayeed M Haque
(74) *Attorney, Agent, or Firm* — Arent Fox, LLP

(57) ABSTRACT

In one aspect, an apparatus of wireless communication at a user equipment includes receiving, during a radio resource control (RRC) setup, a sounding reference signal (SRS) resource set configuration including a specified time offset x. The UE may receive downlink control information (DCI) in a later time slot and an instruction to trigger the SRS resource set. The UE determines, based on information from the SRS configuration or the DCI, a starting position within a time slot for transmitting an SRS resource. The UE transmits, at the starting position x slots after the later time slot, a reference SRS resource selected from the SRS resource set, followed sequentially by the remaining resources. In another aspect a UE that receives a t value of (Continued)

multiple t values may transmit the reference resource in a (t+1)th time slot from a reference slot.

31 Claims, 13 Drawing Sheets

(51) Int. Cl.
  *H04W 72/0446* (2023.01)
  *H04W 72/1268* (2023.01)
  *H04W 72/23* (2023.01)

(56) References Cited

FOREIGN PATENT DOCUMENTS

| WO | WO-2021060301 A1 | * | 4/2021 | ............ H04L 1/0061 |
| WO | WO-2021161223 A1 | * | 8/2021 | ............ H04L 5/0023 |
| WO | WO-2021230795 A1 | * | 11/2021 | |

OTHER PUBLICATIONS

Ericsson: "SRS Performance and Potential Enhancements", 3GPP TSG-RAN WG1 Meeting #1 04-e, R1-2101519, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25-Feb. 5, 2021, Jan. 19, 2021 (Jan. 19, 2021), XP051971680, 26 Pages.

Intel Corporation: "Discussion on SRS Enhancements", 3GPP TSG RAN WG1 Meeting #104-e, 3GPP Draft, R1-2100641, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25-Feb. 5, 2021, Jan. 19, 2021 (Jan. 19, 2021), pp. 1-15, XP051971111.

International Search Report and Written Opinion—PCT/US2022/071710—ISA/EPO —dated Jul. 25, 2022.

VIVO: "Further Discussion on SRS Enhancement", 3GPP TSG RAN WG1 #104-e, R1-2100426, e-Meeting, Jan. 25-Feb. 5, 2021, 22 Pages, Feb. 5, 2021, The whole document.

* cited by examiner

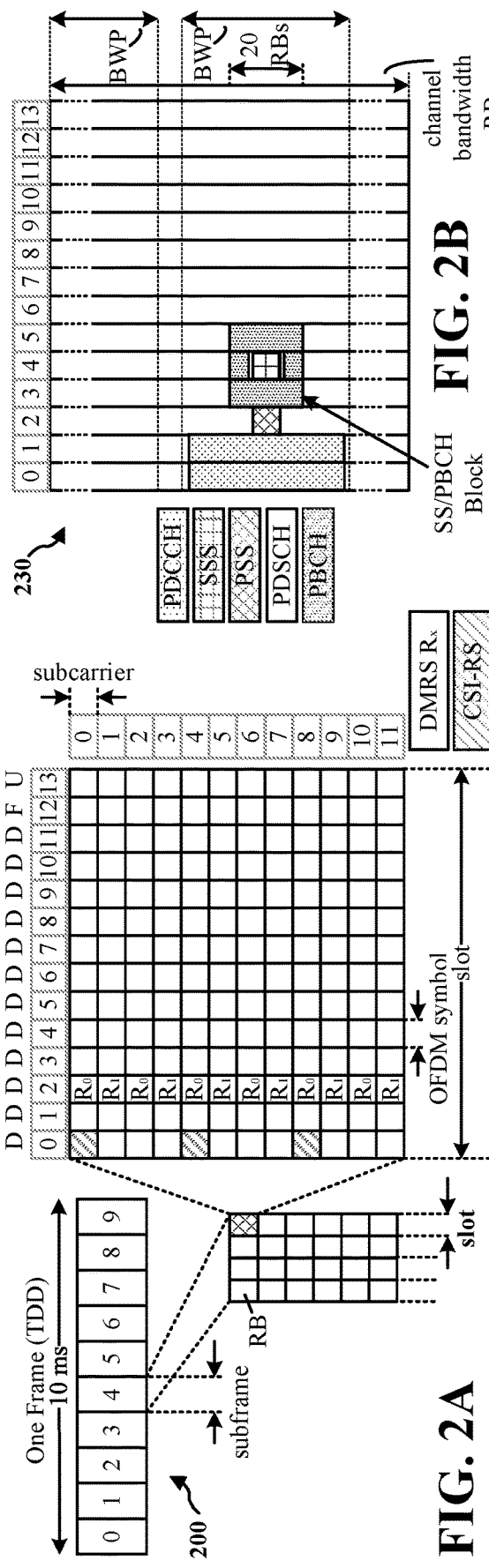
FIG. 2A
FIG. 2B
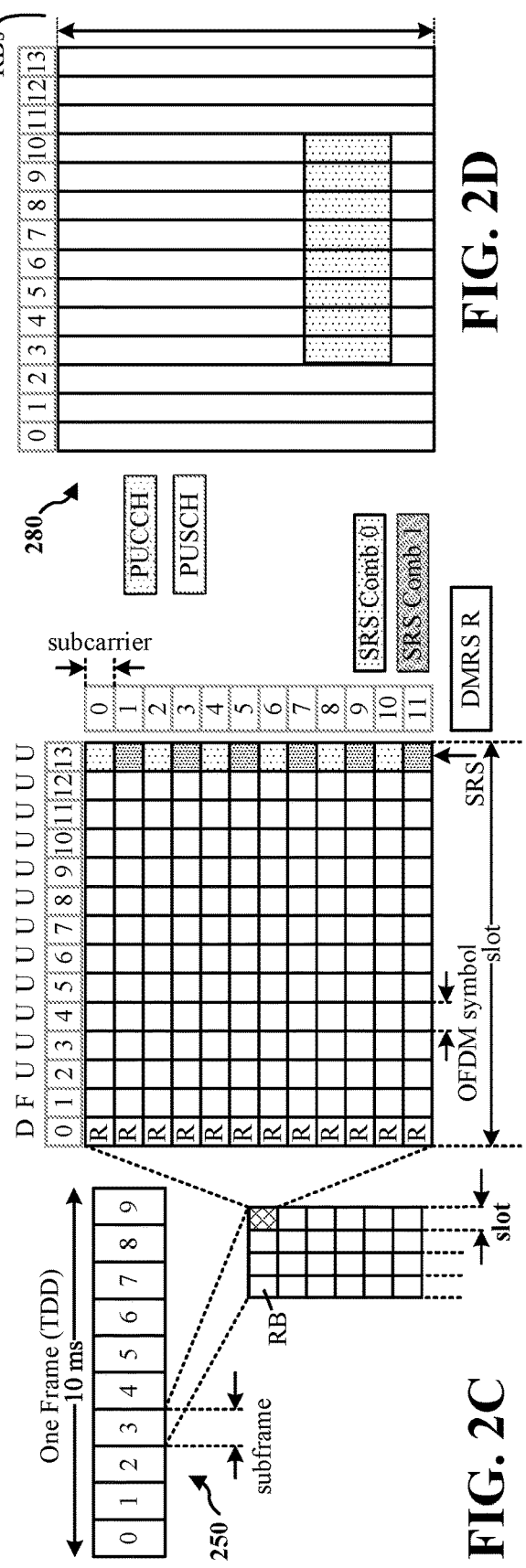
FIG. 2C
FIG. 2D

ENHANCED SOUNDING REFERENCE SIGNAL RESOURCE ALLOCATION USING A SELECTED REFERENCE RESOURCE

BACKGROUND

Technical Field

The present disclosure generally relates to communication systems, and more particularly, to sounding reference signals (SRS) used for channel estimation and timing in wireless networks. Introduction Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various techniques may be used to improve coverage or overall user capacity on a wireless network. For example, so-called "dense deployments" may include network configuration in which the user equipment's uplink transmissions to the network are passed to an uplink receive point ("UL Rx point") positioned in an area proximate the UE. Such UL Rx points are wireless devices that may be distributed across a targeted geographic region. These devices generally have a backhaul connection to a base station and may serve as an intermediary node that effectively passes the UE's uplink transmissions to a base station via the backhaul. In a similar manner, downlink signals from the network in dense deployments may be passed to different types of geographically-distributed serving nodes or base stations, from which the downlink signals are then transmitted to a target UE. These types of intermediary wireless network connections can help reduce occurrence of uplink connection failures due to noisy transmissions from low-power devices, for example. Further, because the UL Rx points need not transmit over the network (other than their backhaul connection), dense deployments can help reduce network deployment costs and complexity.

In other configurations to increase network capacity as the number of users continues to increase, the networks may be supplemented with additional uplink carriers for a single downlink of the same serving cell. In these configurations, uplink transmissions on the two carriers are never simultaneous. UEs however, may be provided with another option to use the supplementary uplink in addition to the conventional time domain non-supplementary uplink. Among other benefits, this configuration provides UEs with additional channel options for uplink transmissions where needed.

Numerous additional examples of deployments similar to the above that increase the overall uplink capacity for devices in the network have been proposed or implemented.

Some of the challenges associated with these and other network enhancements arise in the context of uplink beam management. These challenges may be present in conventional systems, but they may be particularly evident with modern lower-wavelength transmission techniques using beamforming and similar directional transmission techniques. More specifically, in view of the potentially different and increasing uplink carrier possibilities as in the above examples, beam correspondence between the downlink and uplink channels of a UE and a base station, in some cases, may not be assumed. As a result, for example, the network may not be able to rely on downlink reference signals (Synchronization Signal Block (SSB) or Channel State Information (CSI-RS)) to achieve time-domain synchronization with the UE.

Uplink beam management in the absence of beam correspondence may rely on sounding reference signals (SRS) transmitted from the UE for use in channel estimation and timing at the network. Due to potential requirements like a need for different analog beams in transmit versus receive beam-switching, a need that SRS beams be transmitted non-simultaneously, and a need for gaps between different SRS resources (especially at higher carrier frequencies), a total amount of OFDM symbols to accommodate each of these may exceed the slot duration across all SRS resources within the SRS resource set. Current designs may not be able to satisfy all or some of these requirements. For example, all aperiodic SRS transmissions triggered by downlink control information (DCI), and/or all SRS resource within a given SRS resource set may be required to be transmitted in the same slot. This may in some cases place excessive restrictions on the UE.

In light of the foregoing, a need exists for a more flexible and concise use of SRS resources that takes the above limitations and obstacles into account. Various aspects of the present disclosure address these needs. One such aspect takes advantage of certain parameters that are RRC-configured per the SRS resource set including, for example, an offset time slot, a starting position and a number of symbols for transmission. When an aperiodic SRS resource set is triggered by DCI, the UE may select a reference resource with respect to an order or priority based at least in part on the parameters. In some cases, the transmission of the reference resource may thereafter be used as a basis to determine how and when to transmit the remaining resources in the resource set.

In another aspect of the disclosure, similar procedures may be adopted in a wireless network upon a triggering of an aperiodic resource, including selection of a reference resource followed by remaining resources in the SRS resource set. In this aspect, the reference SRS resource may be transmitted in a (t+1)th available slot after having received information identifying a t value of one or more t values. The t value may characterize the end of an uplink or an occupied slot, for example. After the reference resource is transmitted in the (t+1)th slot, remaining resources in the SRS set can be transmitted based on the transmission of the reference SRS slot. For instance, the remaining resources may be transmitted across multiple consecutive available slots in which there are one or more uplink (UL) or flexible symbols for the time domain locations for all of the SRS resources in the SRS resource set. One benefit of this configuration is that the value of t is effectively only applicable to the reference SRS resource. Once the reference resource is determined, the time-domain locations of the remaining SRS resources can be determined accordingly (e.g., using a transmission order previously configured during the RRC setup).

In various embodiments of both of the above-described aspects of the disclosure, different configurations for identifying a starting symbol or starting position for the reference SRS resource are also described herein. In some examples, the starting symbol can be ascertained from the existing SRS configuration. In other examples, the UE may use existing time domain resource assignment (TDRA) resources for defining an available starting position. That is to say, the TDRA table used for configuring the physical downlink and uplink shared channels (PDSCH/PUSCH) may also be used to provide a starting position for an SRS resource. In still other cases, one or more of a new TDRA field or a new TDRA table may be defined for use in identifying a starting symbol.

Accordingly, in one aspect, a method and apparatus of wireless communication at a user equipment (UE) are disclosed. A method of wireless communication at a user equipment (UE) includes receiving, from a base station during a radio resource control (RRC) setup, a sounding reference signal (SRS) resource set configuration including a specified time slot offset X, receiving, in a later time slot, downlink control information (DCI) including an instruction to trigger the SRS resource set; determining, based on information from the SRS resource set configuration or the DCI, a starting position within a time slot for transmitting an SRS resource; and transmitting, at the starting position in a time slot X slots after the later time slot, a reference SRS resource selected from the SRS resource set.

In another aspect, a method of wireless communication at a user equipment (UE), includes receiving, from a base station, configuration information for a sounding reference signal (SRS) resource set, the information including a set of one or more t values identifying a potential time slot for transmitting an SRS resource, receiving, in a later time slot, downlink control information (DCI) including an SRS triggering instruction and a specified one of the t values when the set includes more than one value, determining a (t+1)th time slot counting from a specified reference slot, and transmitting a selected reference SRS resource from the SRS resource set in the (t+1)th time slot.

In another aspect, an apparatus for wireless communication at a user equipment (UE) includes a memory, and at least one processor coupled to the memory and configured to receive, from a base station during a radio resource control (RRC) setup, a sounding reference signal (SRS) resource set configuration including a specified time slot offset X, receive, in a later time slot, downlink control information (DCI) including an instruction to trigger the SRS resource set, determine, based on information from the SRS resource set configuration or the DCI, a starting position within a time slot for transmitting an SRS resource, and transmit, at the starting position in a time slot X slots after the later time slot, a reference SRS resource selected from the SRS resource set.

In another aspect, an apparatus for wireless communication at a base station includes a memory, and at least one processor coupled to the memory to configure, during a radio resource control (RRC) setup with a user equipment (UE), a sounding reference signal (SRS) resource set having a specified time slot offset X, transmit the SRS resource set configuration to the UE, transmit, to the UE in a later time slot, downlink control information (DCI) including an instruction to trigger the SRS resource set, and receive, at a starting position in a time slot X slots after the later time slot, a reference SRS resource selected by the UE from the SRS resource set, wherein one or both of the generated SRS resource set configuration or the DCI includes information identifying the starting position.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
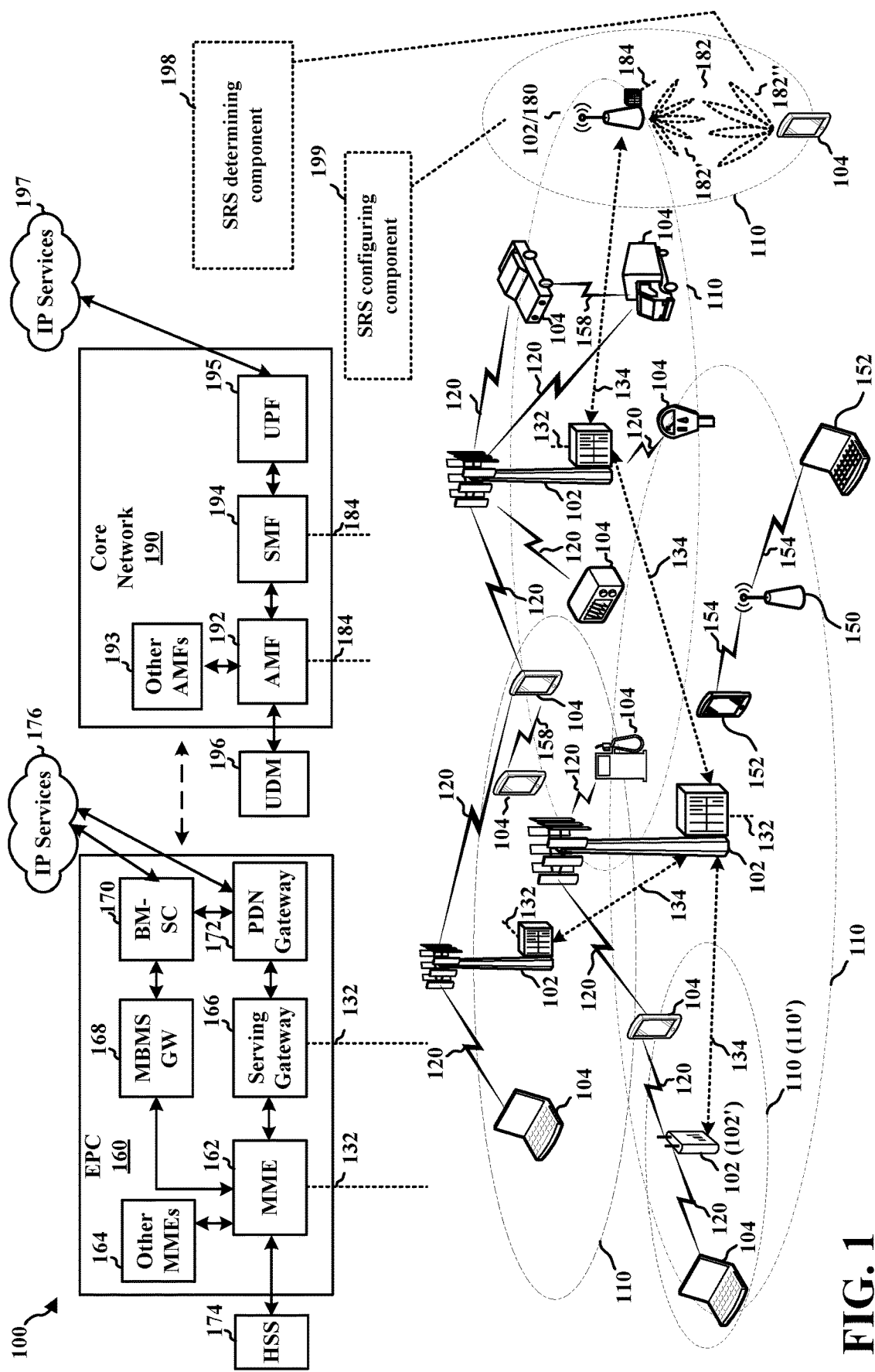
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which may be directly or indirectly (e.g., separated from an IAB donor by more than one hop) and/or one or more of the UEs 104, both of which may have communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring still to FIG. 1, in certain aspects, the base station 102/180 may include SRS configuring component 199 for configuring, during an initial RRC connection with the client, information for an SRS resource set. For example, SRS configuring component 199 may configure an SRS resource set with parameters including a time offset "X", or in other cases, one or more time values t, and other parameters for subsequent use by the UE when the SRS resource set is transmitted. For example, as described in greater detail below, the SRS configuring component 199 may be used for providing a TDRA table during the initial RRC setup and a TDRA field subsequently in the DCI, one or both of which may share functionality with the PDSCH/PUSCH channels, or which tables and/or fields may in other examples be independent. That is, the TDRA table that is currently used in Releases 15/16 for identifying various PUSCH data values may in some cases also be used by the UE to identify SRS resource parameters including time offsets or starting positions. An exemplary TDRA table may be provided, as in Releases 15/16, for the PUSCH as in the following example:

TABLE 6.1.2.1.1-2

Default PUSCH time domain resource allocation A for normal CP

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

In other arrangements. a separate, dedicated TDRA table may be generated and allocated (e.g., in addition to the TDRA table for PUSCH/PDSCH) that is dedicated for use with the SRS resource set. Thus, in the exemplary case of the SRS resource set, the SRS configuration component 199 at base station 102/180 the UE 104 may configure the UE with an SRS-specific TDRA table at an initial RRC setup (and another table may be allocated in this example for the PUSCH/PDSCH).

The base station 102/180 may also configure, in this example, a TDRA field that may subsequently be included in the DCI of a downlink channel transmission. The TDRA field may include information such as pointer values for use by the UE 104 for identifying a starting symbol, or a starting position, a reference slot, an offset slot, etc., for transmitting an initial SRS resource by the UE 104. In these cases, the TDRA field configured by SRS configuring component 199 may be the same field as the TDRA field used for the PUSCH/PDSCH channels. The same TDRA field in these cases may be used for different purposes (SRS resource versus channel assignment), in which case the base station is configured to ensure that different slots are used for identical starting positions to avoid collisions. Accordingly, the TDRA field may be used in the DCI or otherwise to identify configurations for the PUSCH/PDSCH channels, and separately it may be used in the DCI to identify configurations for the SRS resource, as noted, by including a pointer or other reference to starting positions or other data entries in the TDRA table that are relevant to the desired configuration of the SRS resource set.

In another case, the TDRA field, like the TDRA table, may be unique, and generated specifically for SRS purposes. In this example, the SRS configuration component 199 of the base station 102/180 may generate and configure a separate TDRA field—namely, separate from the TDRA field used in the PUSCH/PDSCH channel transmission. In short, (i) the TDRA field provided by the SRS configuration component 199 may constitute a single field used for dual purposes including SRS configurations, (ii) the TDRA field may be distinct from other TDRA fields, (iii) the associated TDRA tables may be used for dual purposes including SRS configurations, and (iv) the SRS configuration component 199 may configure a separate TDRA table, unique to SRS resources.

In still another configuration, certain SRS-relevant information including the desired starting position of a first SRS resource transmitted in the set, may instead be obtained from sources unrelated to the TDRA. For example, the starting position (in some cases, along with other SRS parameters) may be based on information from the received SRS resource set configuration provided during an initial RRC setup by the SRS configuration component 199 of base station 102/180.

With continued reference to FIG. 1, the UE 104 may include SRS determining component 198. SRS determining component 198 may be used to identify parameters needed for transmitting SRS resources when a triggering instruction is received by the base station 102/180. For example, SRS determining component 198 may be used to: receive information related to a specified SRS transmission time offset; to receive an instruction to trigger the SRS resource set; to determine an offset slot for transmitting an SRS resource counting from an initial slot; to determine a starting position within a slot for an initial SRS resource based on received configuration information; and to determine or identify other relevant SRS-based information. Remaining resources may rely on a transmission time of a selected reference SRS resource as a basis for determining their respective transmission slots, depending on a prior network-configured RRC configuration.

Exemplary configuration information above may include initial SRS information configured at the UE. Alternatively or additionally, the configuration information may include identified content within a shared or dedicated TDRA field and/or TDRA table as described in more details in the examples above. The SRS configuration information used by SRS determining component 198 may be obtained from an initial RRC setup, from DCI in a downlink transmission from the base station 102/180, or from other sources. The SRS determining component 198 may use the configuration information and the determined quantities/values to transmit, via an antenna array of the UE 104, a selected SRS resource at a given time, and thereafter, remaining SRS resources in the SRS resource set. In one arrangement, the remaining SRS resources may be sequentially transmitted in consecutive available time slots based on the starting slot or position of the SRS reference resource. The consecutive time slots need not necessarily be directly adjacent, such as in cases where intervening symbols or slots are already occupied or assigned and are consequently not available for transmitting SRS resources. Also, unavailable slots include uplink slots.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where pt is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and as such, it may be used to carry a buffer status report (BSR), a power headroom report (PHR), and/or UCI.

Figure 3:
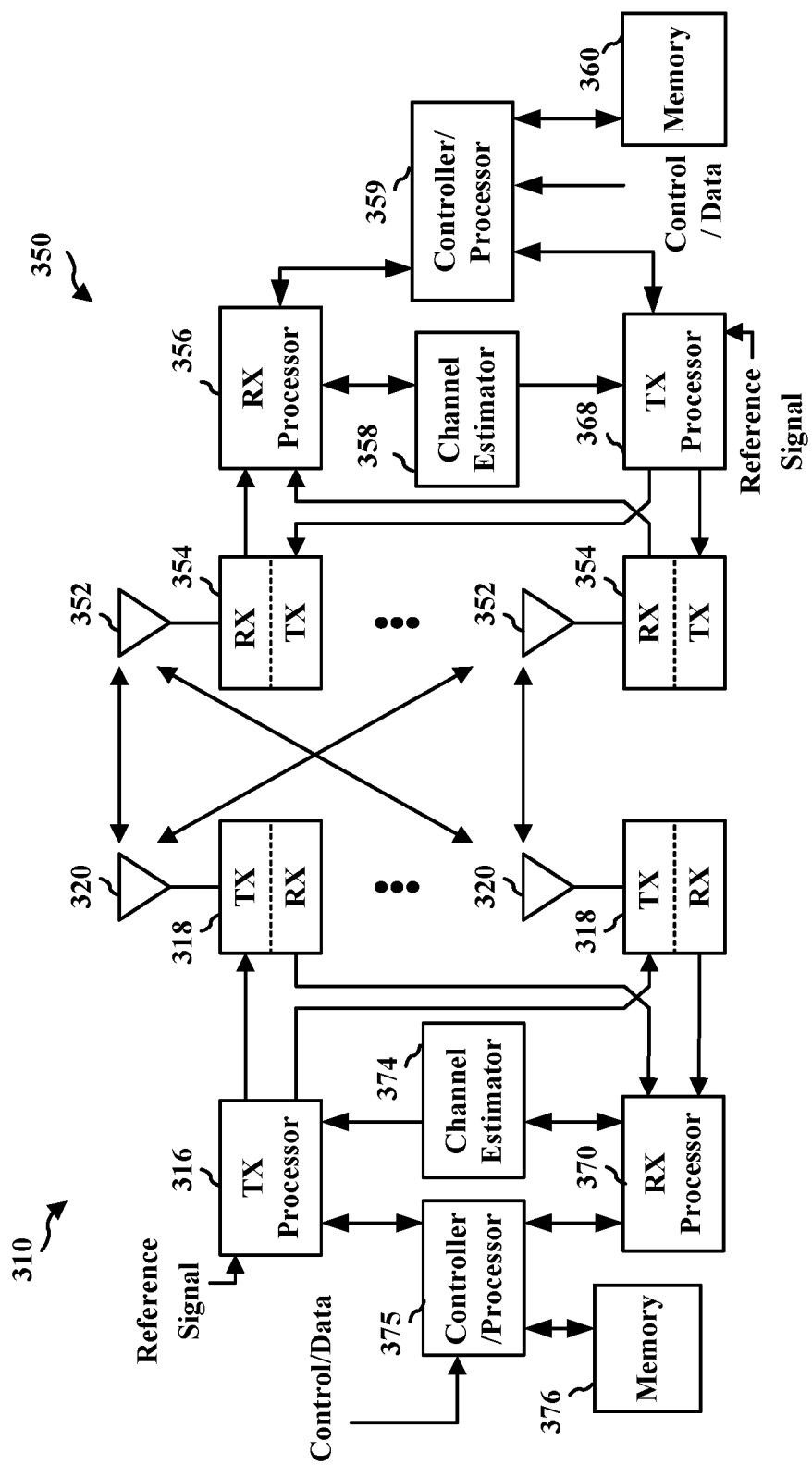
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the information and control signals that were originally transmitted by the base station 310 on the physical channel. The information and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and information. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with SRS determining component 198 of FIG. 1.

At least one of the TX processor 316, the RX processor 370, and the controller/processor 375 may be configured to perform aspects in connection with SRS configuring component 199 of FIG. 1.

The present disclosure describes configurations for SRS resource allocation across one or more slots. While the principles of this disclosure may be applicable to various proposals or implementations of the wireless network configurations described in existing or proposed NR standards, the principles herein are not so limited. Rather, the described features can be used in connection with any of the above-described wireless networks. The principles of the present disclosure can similarly be implemented with other wireless networks, including future wireless networks, not specifically referenced herein. In some instances, for ease of explanation, the principles of the disclosure may be described in the context of these exemplary 5G NR network configurations. However, one of ordinary skill in the art will appreciate, upon perusal of this disclosure, that the principles describing the use by network devices of SRS resources (or analogous network resources) may be applicable to wireless networks in general.

SRS Resources in NR. In certain conventional network proposals, SRS resource set applicability may be configured by the higher layer parameter Usage in the information element SRS-ResourceSet. While various parameters of Usage are available, one exemplary such configuration is identified as {beamManagement}. When Usage is set to this option, only one SRS resource in each SRS resource set may be transmitted at a given instant in time, with certain delineated exceptions. Further, each SRS resource set can be configured with one or more SRS resources, up to sixteen (16). The configured time-domain modes for a resource set include aperiodic, semi-persistent, or periodic.

Aperiodic (AP) SRS resource sets can generally be triggered by the network by including an instruction in the DCI. The SRS request field present in the DCI may further identify the particular SRS resource set to be triggered, if there are more than one. For example, mapping between SRS resource sets and the SRS request codepoints may be provided by the network as part of the information elements aperiodicSRS-ResourceTrigger or aperiodicSRS-ResourceTriggerList. SRS resources in the identified SRS resource set(s) may be transmitted using an offset. For example, conventional proposals include an information element SlotOffset. These proposals, however, do not include implementation details and other SRS configuration information. In various NR proposals, all SRS resources are transmitted in the same slot. In other configurations, it is proposed herein in accordance with an aspect of the disclosure that SRS resources may be transmitted in more than one slot. Among other applications, this proposed configuration may be applicable to Release 17, for example. Also, while the initial slot from which the offset is calculated may in some configurations be the slot in which the DCI is received, in other configurations or in different wireless networks, other slots or time-domain locations may be used for this purpose.

The present disclosure, as noted, addresses the ongoing challenges of establishing and maintaining beam correspondence in wireless networks as the number of network uplinks continues to increase. Many examples of this problem are readily identifiable in network infrastructures in development. One such example includes the use of dense deployments.

Figure 4:
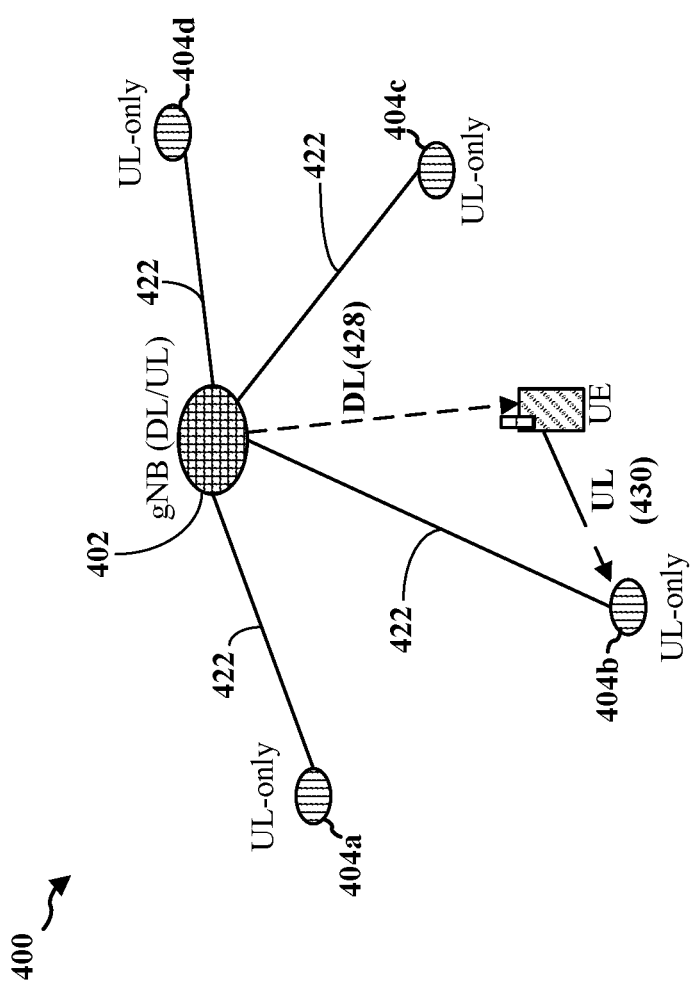
FIG. 4 is a diagram illustrating an uplink dense deployment.

FIG. 4 is a diagram illustrating an example of an uplink dense deployment 400. In this example, a gNB 402 including downlink channels 422 may form a cell or a portion of a cell, or a smaller geographical region in a larger cell. A number of UL Rx points 404a, b, c, and d may be distributed across different locations in that geographical area. In addition, the region may include a number of UEs in arbitrary locations. For simplicity, a single UE 430 is shown positioned proximate to the UL Rx point 404b. The UE 430 receives a downlink transmission 428 from the gNB 402. It should be noted that, while the illustration does not expressly identify additional components, the downlink signals transmitted by gNB 402 may originate from a different base station or node (e.g., a Macro-node, central node, serving cell, serving base station, or the like). Thus in some configurations gNB 402 may function as a local intermediary element of the dense deployment, dedicated to providing downlink transmissions to UEs in the area to which it is assigned.

Similarly, in lieu of transmitting signals on an uplink channel directly to the gNB 402, the UE 430 may instead be configured to transmit uplink information to a UL Rx point (in this case, to UL Rx point 404b, since it is closest to UE 430). Each of the UL Rx points 404a-d, in turn, may be connected to the Macro node via a backhaul connection. The Macro-node may be gNB 402, or it may be another node not illustrated. As noted above, the Macro-node may be transmitting downlink information to gNB 402 for distribution to UEs in the vicinity.

Referring still to FIG. 4, the presence of the UL Rx points 404a-d help to reduce uplink path loss (or noisy uplink transmissions from low-power devices) by allowing the UEs to transmit to a nearby one of the UL Rx points 404a-d. Because the UL Rx points 404a-d have an existing backhaul connection to the Macro-node, the UL Rx points 404a-d can receive the UL signal and send it to the Macro-node over the existing backhaul, which significantly reduces the UL Rx points' need to process the signal. Further, the UL Rx points 404a-d in the configuration of FIG. 4 are not configured to transmit any downlink signals. As a result, the deployment cost and complexity of the configuration in FIG. 4 may be reduced.

The distributed configuration of FIG. 4 may be desirable as the number of network devices continue to grow. In addition to the signal power advantages, the dense deployment's use of multiple UL Rx points 404a-d can add considerable uplink capacity and therefore can enhance coverage. However, because the UE's uplink transmissions are not received by a base station but passed through a mediating device, it is likely that UE 430 has no present beam correspondence on the uplink channels. Thus, the UE 430 may be relegated to using an SRS resource set to regain correspondence when the need arises. The same may be true of all the UEs in the region.

Similar to dense deployment of FIG. 4, UEs may be equipped with a supplementary uplink as described above. In that case, the UE may be configured with two uplink carriers for the same serving cell for use in non-simultaneous transmissions. For instance, a UE may be able to transmit on the uplink via a TDD band (not using the supplementary uplink) and the supplementary uplink, or just on the supplementary carrier. Because the UE may not be configured for a particular base station, it generally lacks beam correspondence with the base station and must use SRS for that purpose.

Figure 5:
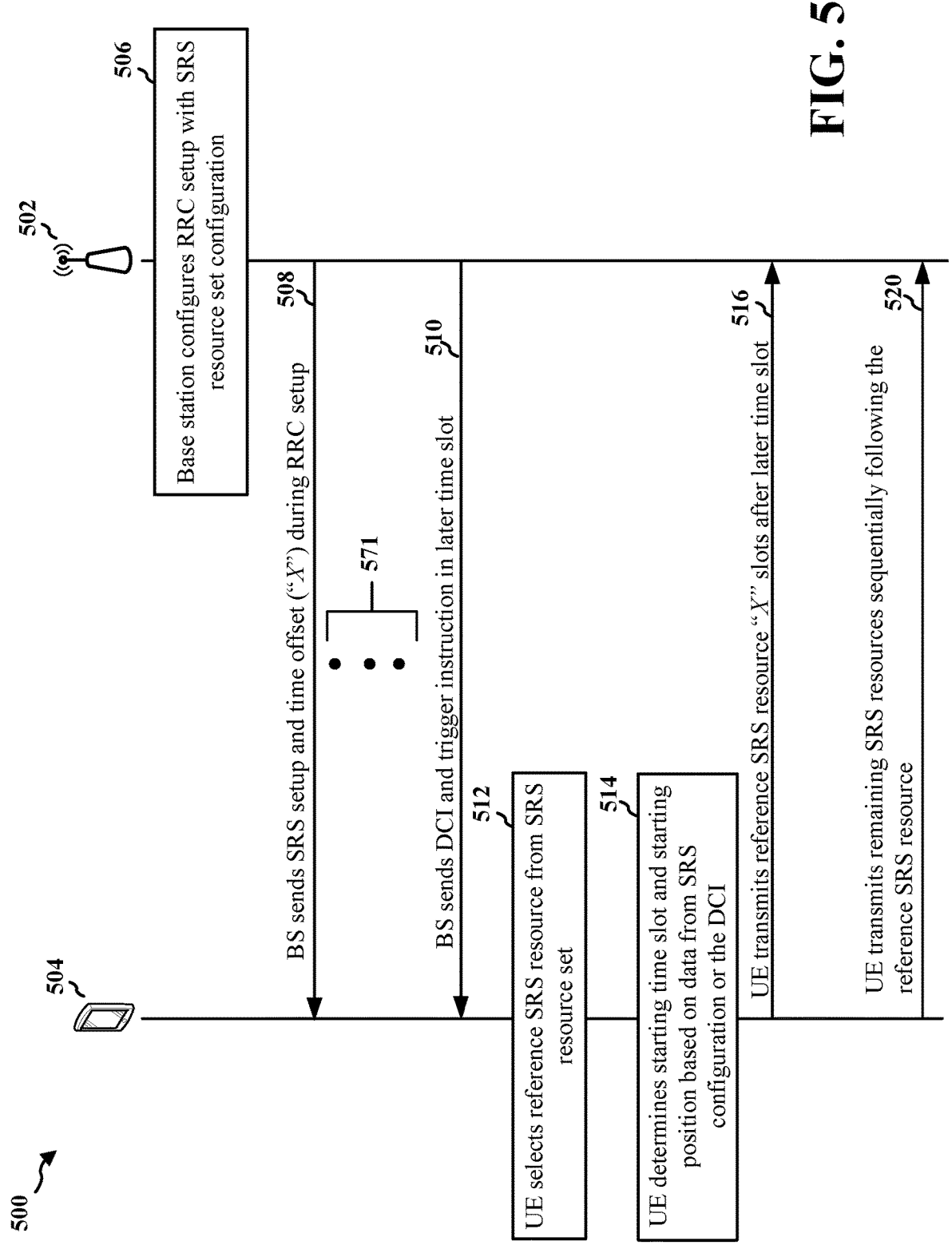
FIG. 5 is a timing diagram illustrating an exchange of signals between a user equipment and a base station.

FIG. 5 is a timing diagram illustrating an exchange of signals 500 between a UE 504 and a base station 502. While a single base station 502 is portrayed in the drawing, in some instances more than one base station 502 may be used to communicate with the UE 504. At block 506, the base station 502 configures an RRC set with an SRS resource configuration. Having established an RRC connection with the UE 504, the base station provides the configuration information including the SRS setup and time offset ("X"), along with other information (such as a TDRA table) to the UE 504, as shown in 508.

The three vertical dots 572 in FIG. 5 signify the optional passage of time, during which the devices may be engaged in other activities. At 510, BS 502 transmits in a later slot a downlink signal to UE 504 including DCI, which may further include an instruction to trigger one of the SRS resource sets. At 512, the UE may select a reference resource from the SRS resource set. Thereafter, at 514, based on one or both of information from the SRS configuration received earlier during the RRC connection or information in the DCI, the UE 504 determines a starting time slot and starting position. The UE 504 transmits the designated reference resource "X" slots after the later time slot in which the DCI with the triggering instruction was transmitted, as in 516. The selection and use of a single reference resource advantageously obviates the need for direct network involvement in the transmission of the remaining resources, the latter of which can be transmitted based upon the transmission of the reference resource (The order of transmission can be determined in a prior RRC exchange). In terms of transmission order, in one example, the network during RRC may configure the SRS resources to be transmitted the remaining SRS resources sequentially following the reference resource. In another example, the transmission within the slot can be consecutive in adjacent positions, beginning with the transmitted reference slot and ending with the highest-valued SRS resource in the set.

The above procedure can be used to enable a UE to quickly establish beam correspondence with the network, using an SRS resource set in which the UE used information in the DCI or pre-configured information from an RRC setup to determine a slot for SRS transmission and a starting position within the slot, wherein a reference slot was selected to enable expedient transmission of the remaining resources based on the slot corresponding to the SRS reference resource transmission, or as otherwise preconfigured during RRC by the network.

Figure 6:
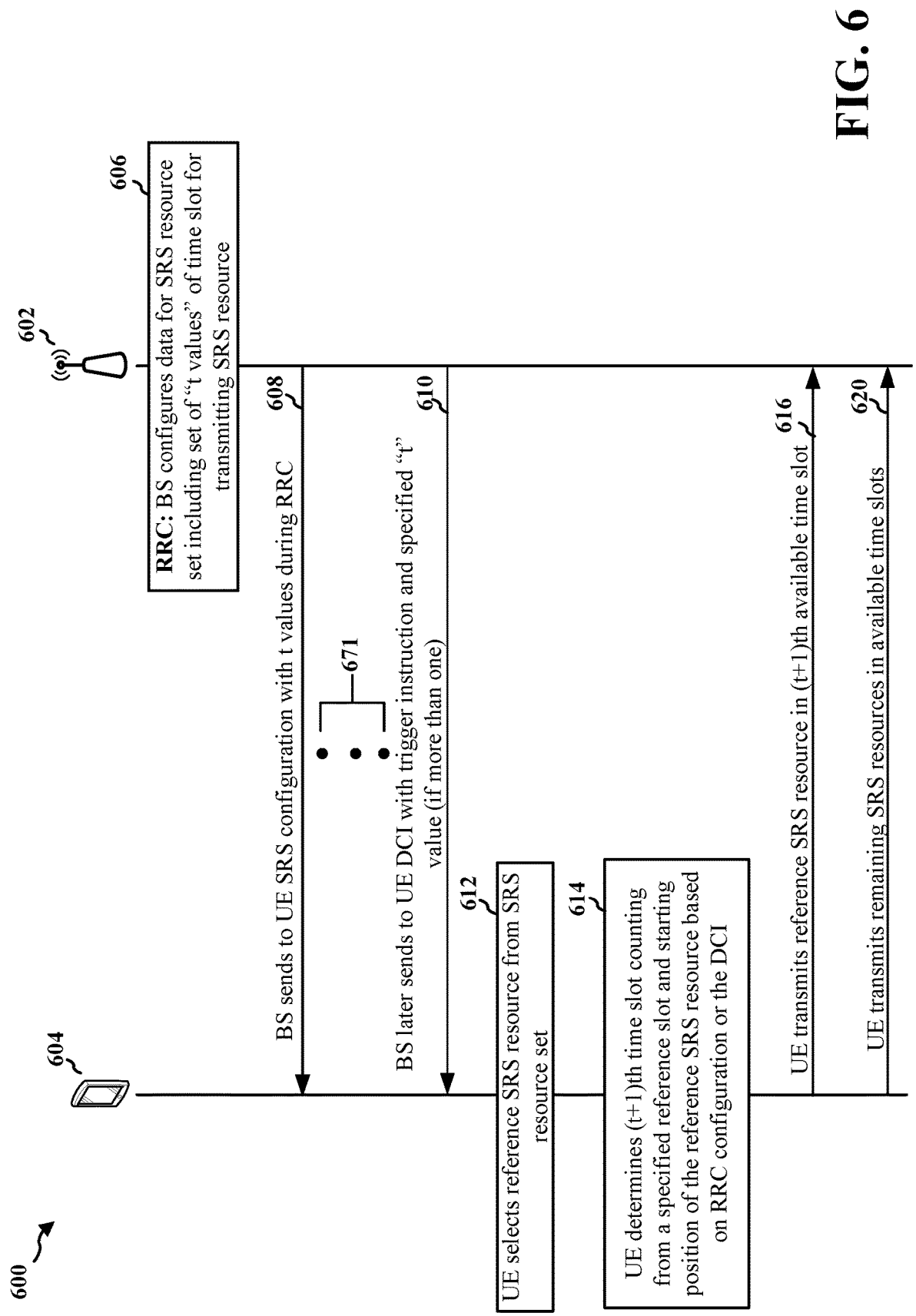
FIG. 6 is a timing diagram illustrating another exchange of signals between a user equipment and a base station.

FIG. 6 is a timing diagram illustrating another exchange 600 of signals between a user equipment 604 and a base station 602. In an RRC connection setup (606), the base station 602 may configure information corresponding to the SRS resource set, which includes providing a set of t numerical values corresponding to potential time slots for transmitting SRS resources. At 608, base station 602 transmits this SRS configuration along with the set of t values to the UE 604. The "set" of t values is defined for purposes of this disclosure to include one or more t values. After the optional passage of time 671 in which one or both devices may be engaged in other procedures, the BS transmits DCI in a downlink slot to the UE at 610, where the DCI includes an instruction to trigger the SRS resource set. Further, in this example, if the previously-sent set of t values includes more than one such value, the DCI may include information specifying to the UE 604 the applicable t value. In one case, the t value may be indicative of the last "busy" or "downlink" slot prior in time to one or more available uplink or flexible slots for SRS transmission.

At 612, the UE 604 selects a reference SRS resource from the available SRS resources from the SRS resource set. At 614, the UE 604 may determine the applicable (t+1)th time slot for transmitting an SRS resource counting from a specified reference slot and starting position of the reference SRS resource, and based on RRC configuration or the DCI. The UE 604 transmits the reference SRS resource in the (t+1)th time slot in 616. At 620, the UE may transmit the remaining resources in available time slots after the reference SRS based on a prior RRC configuration. In some examples, the available time slots include consecutive time slots that are either flexible or uplink time slots. For purposes of this disclosure, two slots separated by a busy or pre-allocated block may still be consecutive.

Figure 7:
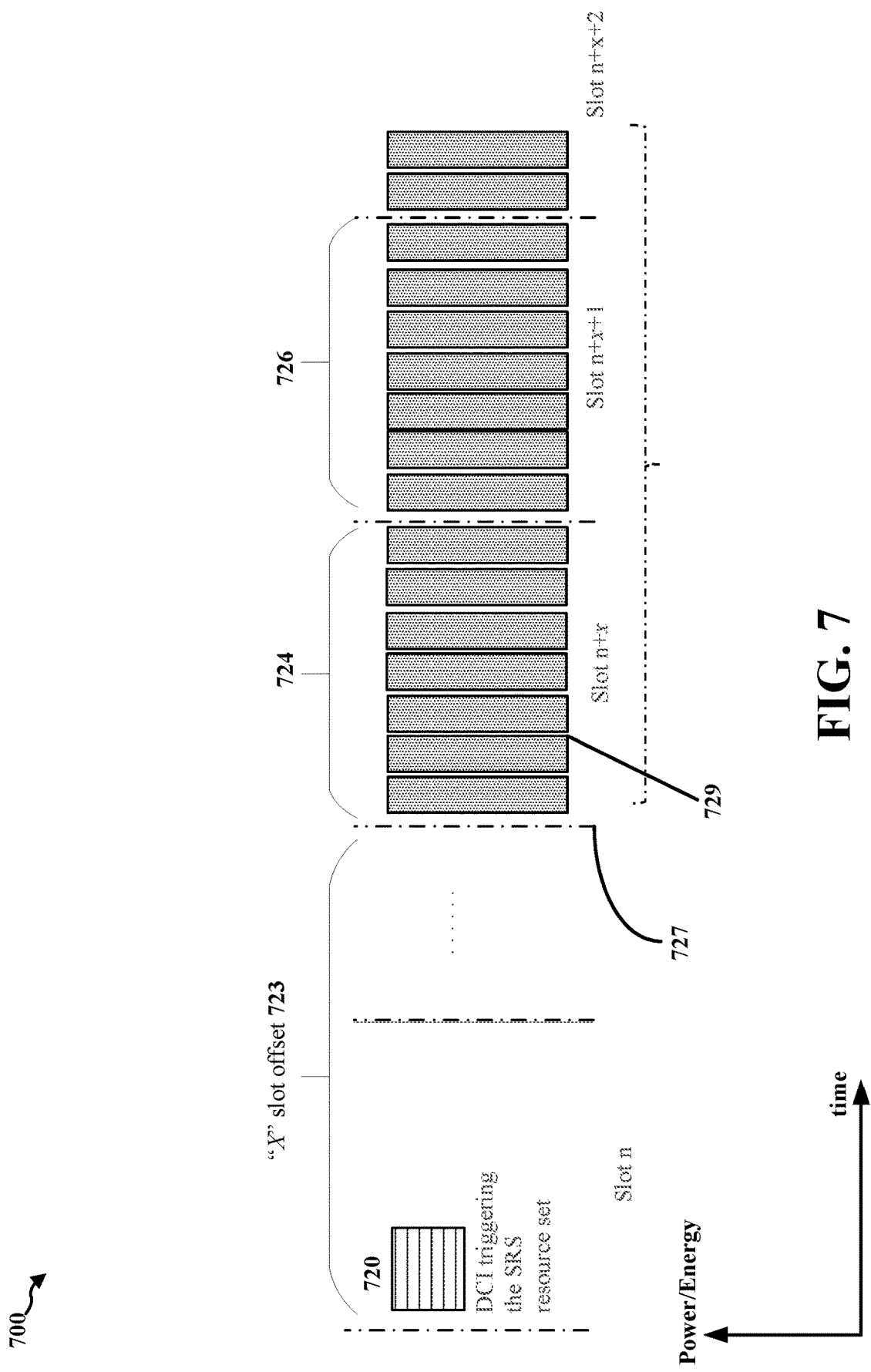
FIG. 7 is a timing diagram illustrating downlink control information (DCI) transmitted with a slot offset.

FIG. 7 is a timing diagram 700 illustrating downlink control information (DCI) transmitted with a slot offset. In the diagram, the horizontal axis represents time, and the vertical axis represents power or energy, the latter indicating the presence or absence of a wireless transmission. The block 720 illustrates the transmission by a base station of DCI including an instruction to trigger an SRS resource set of a recipient UE. FIG. 7 further illustrates slot offset 723, which is a slot offset "X" determined by the UE based on receiving one or both of the configured RRC information or the DCI. The UE therefore may transmit the selected reference SRS resource in slot n+1 as shown, at a starting position determined based on the information received or configured at the UE as described in greater detail below. It should be noted that the diagram in FIG. 7 need not be specific to any particular network; the slot configuration is shown for simplicity and illustrative purposes only. Based on the transmission of the reference SRS resource at the illustrated starting position, the remaining resources may be transmitted in slot n+1. FIG. 7 also shows subsequent slots including slot n+X+1 and a portion of slot n+X+2, e.g., for other exemplary network configurations in which the SRS resources may be transmitted in more than one slot.

Figure 8:
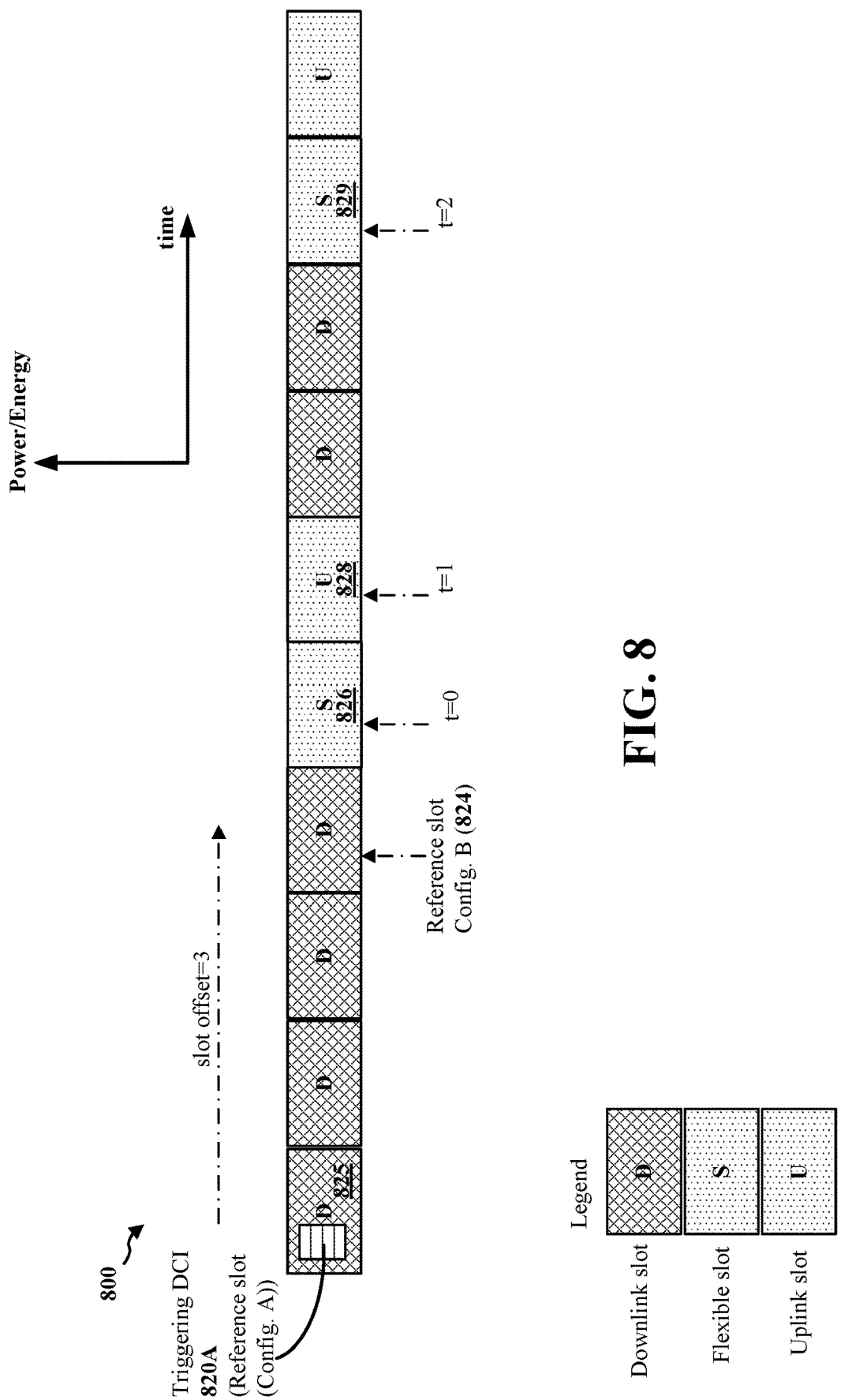
FIG. 8 is a timing diagram illustrating an example slot configuration.

FIG. 8 is a timing diagram 800 illustrating an example slot configuration. For example, in FIG. 8 as in Release 17, different t values may be used to identify potentially available time slots (e.g., t=0 ("S" slot 826)), (t=1 ("U" slot 828), and t=2 ("S" slot 829). FIG. 8 includes an example of various different reference slots that may be used in different configurations. The legend in the figure demonstrates downlink, flexible and uplink slots, D, S and U, respectively, which for ease of reference are distinguished based on texture. In the example shown, two possible reference slot configurations are identified. The first reference slot is the slot 825 in which a SRS triggering DCI 820a is sent. The second reference slot includes slot 824, in which the reference slot may be indicated by the conventional triggering offset such as shown by the "slot offset=3" indication. A list of t values may be configured. In Release 17, the entire aperiodic SRS resource set, including all resources within the set, is transmitted in an available slot counting from the reference slot. However, there currently lacks any method for using the available mechanisms to enhance the transmission of SRS resources within the SRS resource set in different slots, to make the overall network more robust and less prone to beam incoherence.

In another aspect of the disclosure, techniques are disclosed for triggering an aperiodic resource set. The UE may identify a reference slot, such as the (t+1)th available slot, for transmitting an SRS reference resource selected by the UE. The remaining SRS resources, rather than being transmitted per the available (t+1)th slot counting from the reference slot as in conventional proposals, are based on the transmission time of the SRS reference resource. For example, the remaining SRS resources may be transmitted in subsequent available slots after transmission of the reference SRS resource. In this configuration, available slots are determined for all the SRS resources in the SRS resource slot—namely, in a plurality of consecutive available slots, where available slots are the one or more slots that include uplink or flexible symbols for the time domain locations of all SRS resources in the SRS resource set. The starting symbols within the slot assigned to the reference SRS resource and following resources may include the same configurations as described in earlier embodiments and detailed below.

In this approach as noted above, the t value for identifying an available slot counting from a reference slot is only applicable to the reference SRS resource. Once the time-domain location of the reference SRS resource is determined based on the slot offset, the time-domain locations of the remaining SRS resource can be determined as described above. Among other benefits, the timing of the reference resource can be selected as a basis for remaining resources, which in turn accords the UE more flexibility.

Figure 9:
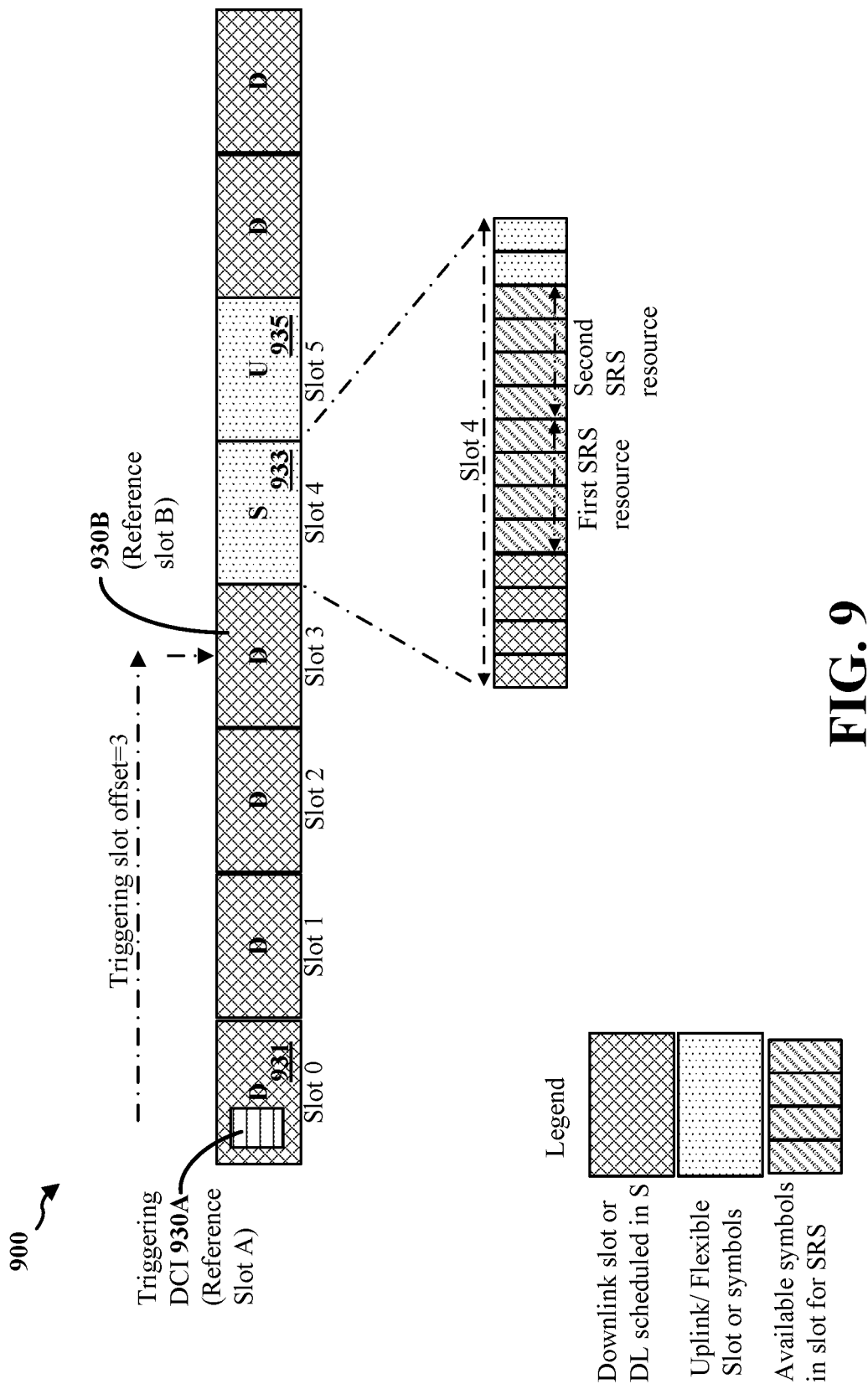
FIG. 9 is a timing diagram illustrating a UE transmitting SRS resources at a starting position within a slot.

FIG. 9 is a timing diagram illustrating a UE transmitting SRS resources at a starting position within a slot. As shown in FIG. 9, DCI 930A including the instruction to trigger the SRS resource is received from the network in slot 0 (931). It is assumed for purposes of this configuration that the reference slot is the triggering slot 931 as well. The UE also determines, based on the DCI or on the prior SRS configuration during the RRC setup, that the (t+1)th available slot is the S slot 933 right after the downlink slot 930B. The UE 104 still further receives information that enables it to identify a starting position. Similar to earlier aspects, the UE 104 may obtain this information from one or both of the RRC or DCI information using various different implementations. In one such implementation, the starting symbol within a slot of the reference SRS resource may be RRC-configured. In another implementation, the SRS starting symbol may be indicated by an existing TDRA field obtained in the DCI. The TDRA field may point to a value in the existing RRC-configured TDRA table, which in turn may identify a starting position. Because the same starting symbol may be configured for the PDSCH/PUSCH channels, the UE 104 must be sure to avoid transmitting the reference SRS resource in a slot already occupied by a device transmitting over the PUSCH, for example, in the same slot.

In another implementation, the base station 102/180 is instead configured to transmit a separate, dedicated table in the RRC setup for the SRS resource set configuration. The UE can use the TDRA field received in the DCI to identify an SRS-specific time slot from the SRS table, which may include a list of such time slots to which the existing TDRA table can be mapped.

In still another implementation, a new TDRA field may be appended to or inserted within the DCI, which includes a pointer to the new TDRA table (or to an existing TDRA table used for PUSCH/PDSCH transmissions).

Referring back to FIG. 9, it is assumed for illustrative purposes that slot 4 is partitioned into fourteen (14 symbols). The first SRS, or the reference SRS, may be transmitted in the fifth symbol according to a specified value (e.g., from an RRC-configured SRS-based TDRA table). Thereafter, because the symbol after the completion of the first (reference) SRS resource is shown as available, the next SRS resource can transmit in the following four symbols. Consecutive transmissions of this nature can continue into slot 5 (935), until all SRS resources are transmitted or until a busy or uplink symbol is encountered. In this latter case, the remaining SRS resources can be transmitted in the next available slot, if necessary, that includes an available starting symbol.

Figure 10:
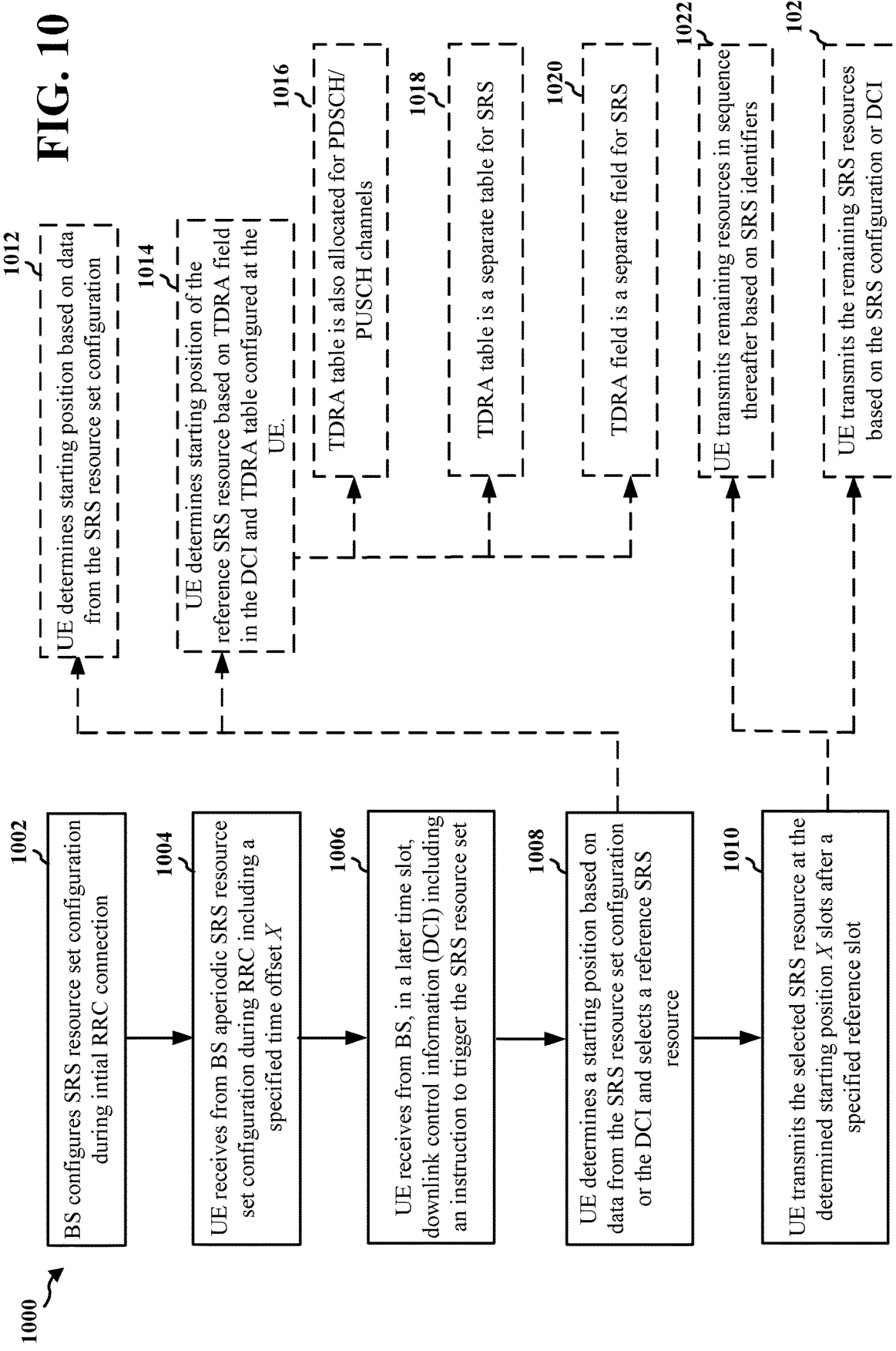
FIG. 10 is a flowchart of a method of wireless communication.

FIG. 10 is a flowchart 1000 of a method of wireless communication. The UE 504 in the timing diagram described in FIG. 5 may be the UE 104 of FIG. 1, the UE 350 in FIG. 5, the UE described in connection with FIG. 7, and the apparatus in FIG. 12. The base station may include base station 102/180 of FIG. 1, base station 310 of FIG. 3, and the apparatus of FIG. 13, for example. The boxes and lines in dashed mark represent optional configurations that the UE can decide to instead deploy.

At 1002, the base station configures the SRS resource set configuration during an initial RRC connection. For example, the base station may configure the UE with a TDRA for use in identifying a starting symbol. The base station may provide a reference slot, slot offset, and other information. In other configurations, this information may be provided at least in part by the DCI. At 1004, the UE receives from the base station the aperiodic SRS resource set configuration during the RRC, including a specified time offset X In a later time slot, the base station may determine that the UE should transmit one of its SRS resource sets (if it has more than one). The BS issues an instruction on the downlink, and at 1006, the UE receives from the base station at the later time slot DCI including an instruction to trigger the SRS resource set. The UE may then determine a starting position at 1008 based on information from the SRS resource set configuration or the DCI, and may also select an SRS resource as a reference resource. In different configurations, the selection may occur in different orders. For example, the UE may have already selected the SRS reference resource prior to determining the starting position, which configuration remains in the scope of this disclosure. At 1010, the UE transmits the selected SRS resource X slots after a specified reference slot, at the determined starting position. The reference slot may be specified in the DCI, the RRC configuration, or it may be preconfigured in the UE.

The remaining SRS resources may then be transmitted. In one example, at 1022, the UE may transmit the remaining resources in sequence based on the SRS identifiers. For example, the UE may transmit the remaining SRS resources in ascending order of the SRS resource identifiers. In another example, the UE may at 1024 transmit the remaining resources based on information in the SRS configuration or the DCI.

UE 104 may next determine a starting position based on information from the SRS resource set configured at the UE during the RRC setup (1012). In other configurations, at 1014, UE 104 can determine a starting position of the reference SRS resource based on the TDRA field present in the DCI, as well as the earlier-configured TDRA table, which may be used for use in both PUSCH/PDSCH transmissions and SRS transmissions, such as in 1016.

At 1018, the table configured during the RRC setup is a TDRA table, but a separate table allocated for use in identifying SRS starting positions. At 1020, the TDRA table includes a separate field, e.g., provided with the DCI. The TDRA table may include a pointer to an existing TDRA field, or to a new TDRA field dedicated to SRS resources. In another example, at 1020, the TDRA field is a separate field for SRS resources.

Figure 11:
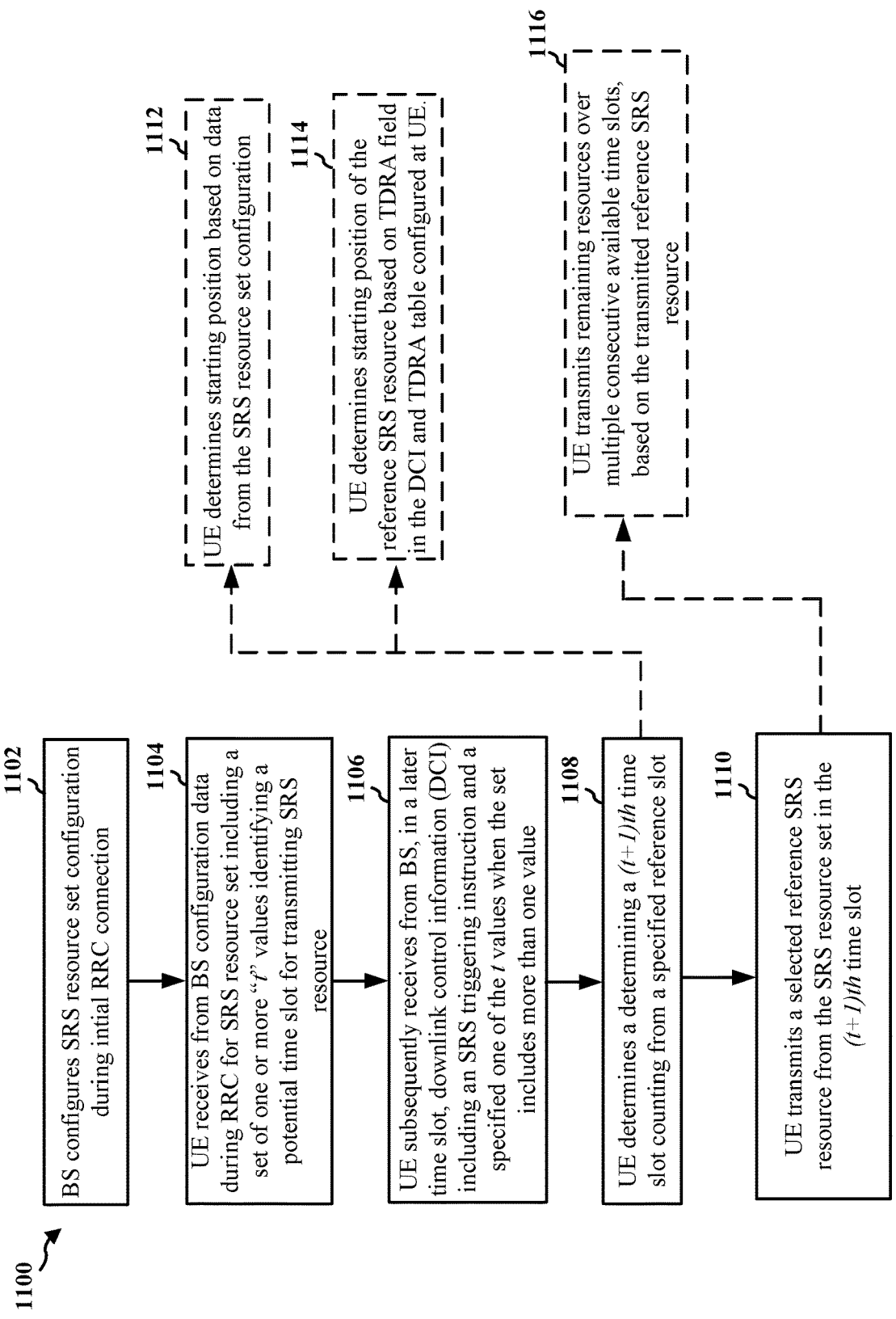
FIG. 11 is a flowchart of another method of wireless communication.

FIG. 11 is a flowchart 1100 of another method of wireless communication. The UE 504 in the timing diagram described in FIG. 5 may be the UE 104 of FIG. 1, the UE 350 in FIG. 5, the UE described in connection with FIG. 7, and the apparatus in FIG. 12. The base station may include base station 102/180 of FIG. 1, base station 310 of FIG. 3, and the apparatus of FIG. 13, for example.

The base station may configure, at 1102, an SRS resource set configuration for a UE during an initial RRC connection. The UE receives the configuration information from the base station during the RRC setup for the SRS resource set(s) (1104). The UE may receive, from the base station in a later time slot, downlink control information (DCI) including an SRS triggering instruction and, if necessary, a specified t value corresponding to the SRS transmission slot (1106 ). In the case where one t value is initially configured at the UE, the base station may not need to specify the t value, which is already known at the UE from the RRC configuration. Where more than one t values are provided during the RRC setup, the BS may specify the applicable t value in the DCI.

At 1108, the UE may determine a (t+1)th time slot counting from a specified reference slot. The reference slot may be provided in the DCI, the RRC setup, or it may be a preconfigured parameter in a non-volatile memory of the UE. At 1110, the UE may select a reference SRS resource and may transmit the selected reference resource in the (t+1)th time slot. In this configuration, the DCI timing information is used for the reference SRS resource. For example, at 1116, the UE may transmit the remaining resources over multiple consecutive available time slots, based on the transmitted reference SRS resource (and depending on an RRC configuration), in which available time slots include unoccupied uplink or flexible time slots (and symbols therein).

At 1112, as in previous cases, the UE may determine a starting position based on information from the RRC setup. At 1114, the UE may instead determine the starting position of the reference SRS resource based on an existing or dedicated TDRA field received in the DCI, which in turn may reference an existing PUSCH/PDSCH-based TDRA table or dedicated SRS data field that references one of these tables.

Figure 12:
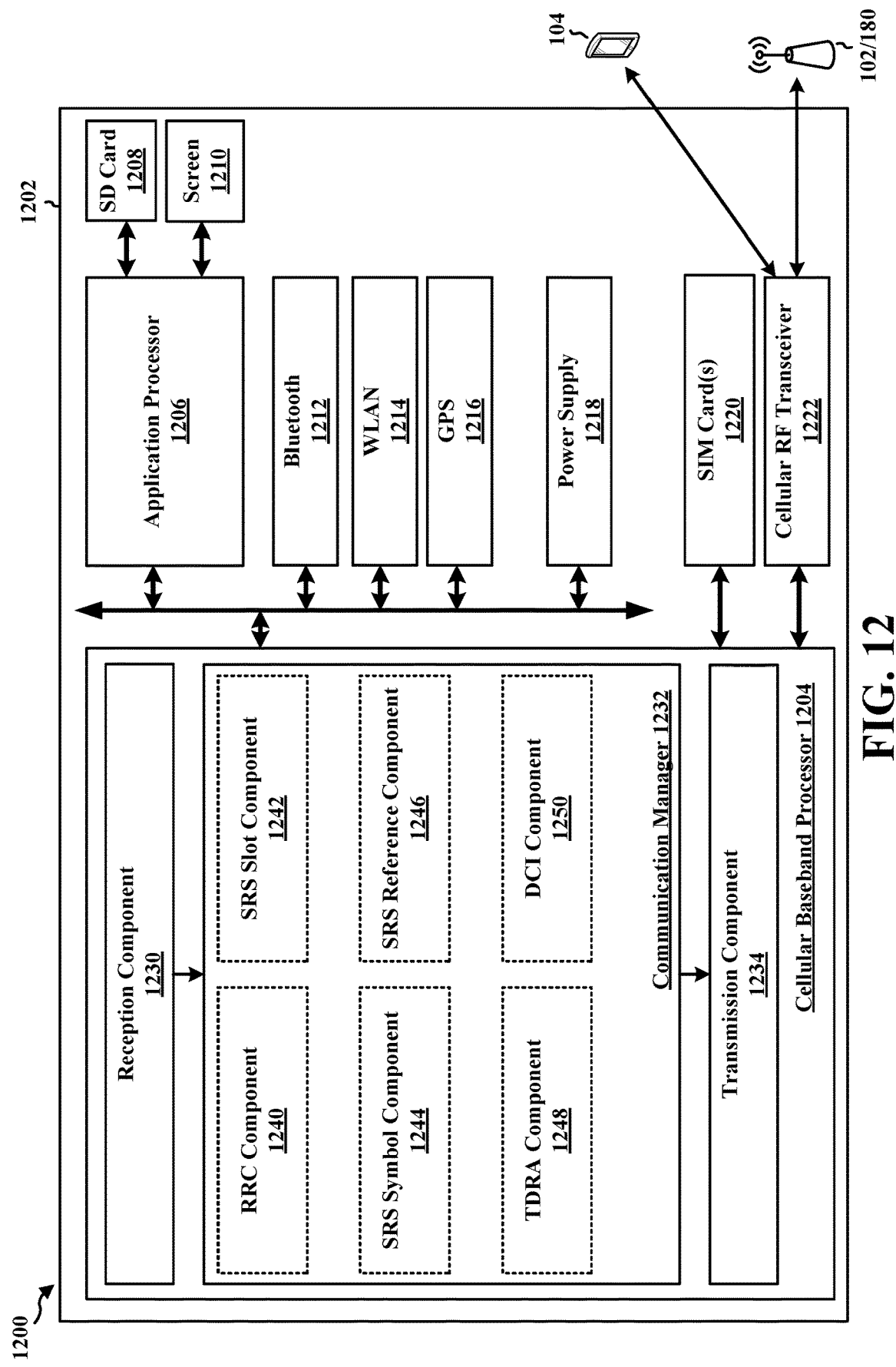
FIG. 12 is a diagram illustrating an example of a hardware implementation for an example apparatus.

FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or base station 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/ memory may also be used for storing information that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204.

In the context of FIG. 3, the cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., the UE 350 of FIG. 3) and include the aforementioned additional modules of the apparatus 1202. In one configuration, the cellular RF transceiver 1222 may be implemented as at least one of the transmitter 354TX and/or the receiver 354RX.

The communication manager 1232 includes an RRC component 1240 that is configured to receive from the base station an aperiodic SRS resource set configuration, e.g., as described in connection with step 1004 of FIG. 10 and step 1104 of FIG. 11. The communication manager 1232 further includes an SRS slot component 1242 that receives input in the form of RRC configuration information from the component 1240 and is configured to determine a slot to transmit an SRS resource, e.g., as described in connection with steps 1006, 1008 and 1010 of FIG. 10 and steps 1104. 1106 and 1108 of FIG. 11.

The communication manager 1232 further includes an SRS symbol component 1244 that receives input in the form of RRC configuration information, or separate or dedicated TDRA fields or tables, from the component 1240 and is configured to determine a starting position based on information from the RRC configuration at the UE or the DCI, as described in connection with step 1008 in FIG. 10 and steps 1112 and 1114 in FIG. 11. The communication manager 1232 further includes an SRS reference component 1244 that receives input in the form of DCI information from DCI component 1250 and RRC configuration information from RRC component 1240 and is configured to select a reference SRS resource for transmitting based on a DCI triggering instruction, as described in connection with step 1010 of FIG. 10 and step 1110 of FIG. 11. The communication manager 1232 further includes a TDRA component 1248 configured to maintain one or more of a shared PUSCH/PDSCH TDRA field or a dedicated SRS field, and/or a shared PUSCH/PDSCH table or a dedicated SRS field. SRS symbol component 1244 may receive information from TDRA component when determining a starting position for the selected SRS resource. The communication manager also includes a DCI component 1250, which may receive and store SRS-related information from DCI received, including a trigger instruction and slot information. The slot information may be provided to the SRS slot component 1242 for determining a slot in which to transmit.

The apparatus 1202 may include additional components that perform some or all of the blocks, operations, signaling, etc. of the algorithm(s) in the aforementioned flowchart(s) of FIGS. 10 and 11. As such, some or all of the blocks, operations, signaling, etc. in the aforementioned flowchart(s) of FIGS. 10 and 11 may be performed by a component and the apparatus 1202 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
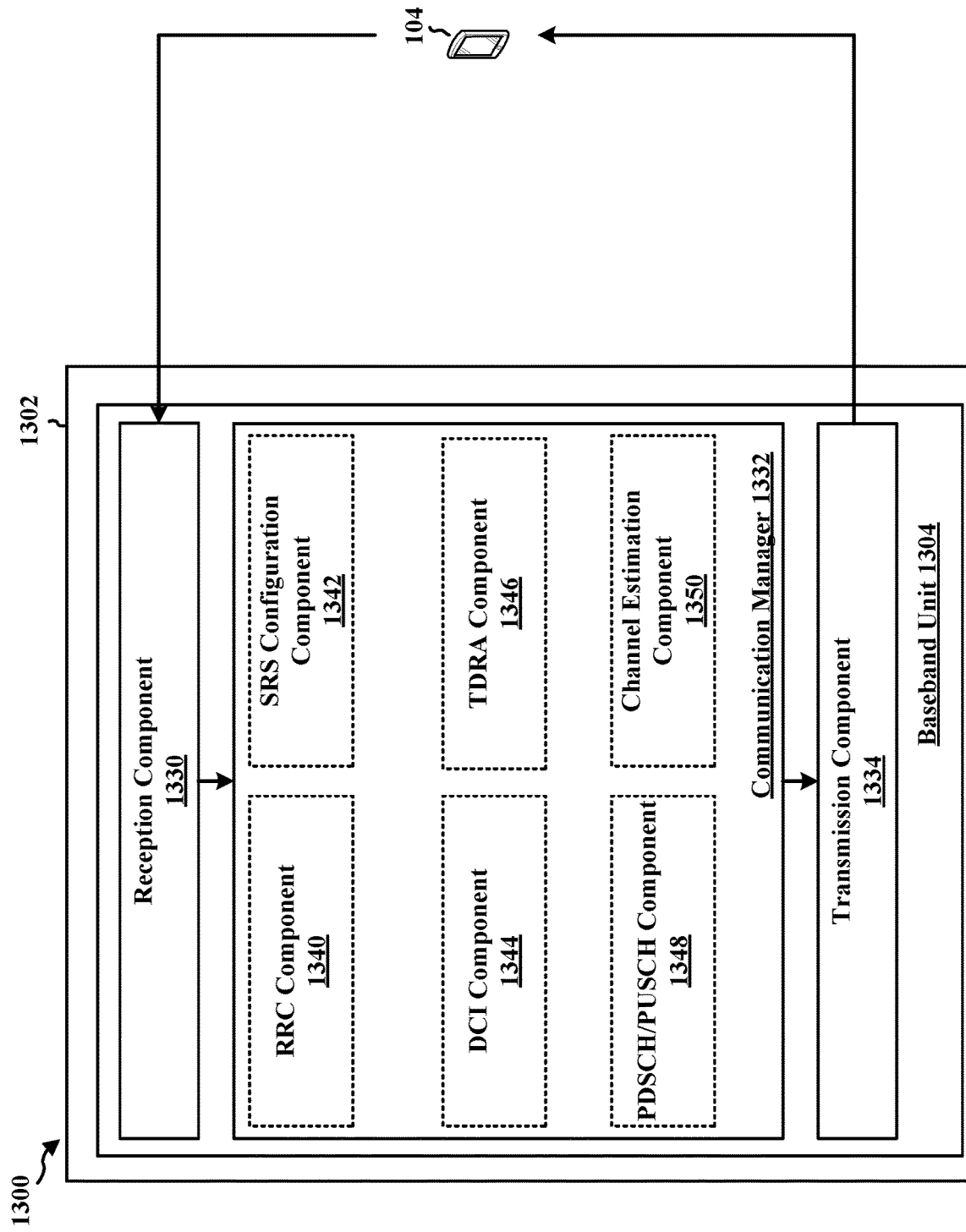
FIG. 13 is a diagram illustrating another example of a hardware implementation for another example apparatus.

FIG. 13 is a diagram 1300 illustrating an example of a hardware implementation for an apparatus 1302. The apparatus 1302 is a base station and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing information that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes an RRC component 1340 that configures a UE during an RRC setup and provides configuration information including, for example, slot information, reference slot, offsets, and other information, e.g., as described in connection with step 1002 in FIGS. 10 and 1102 in FIG. 11. The communication manager 1332 further includes an SRS configuration component 1342 that may be used to generate and provide SRS configuration information for a UE at various stages of a connection, and may pass the generated information to DCI component 1344 for transmitting DCI information including an instruction to trigger an SRS resource set e.g., as described in connection with steps 1006 in FIGS. 10 and 1106 from FIG. 11. The communication manager 1332 further includes a TDRA component 1346 that is configured to determine and/or generate one or more TDRA fields and tables for use by a UE in determining a starting position within a slot, e.g., as described in connection with step 1008 in FIGS. 10 and 1112 and 1114 of FIG. 11.

The communication manager 1332 further includes a PDSCH/PUSCH configuration component 1348 that receive a TDRA field and a TDRA table from TDRA component 1346, and may use this component in transmission involving PDSCH/PUSCH channels. The communication manager 1332 further includes a channel estimation component 1350, that may be used to receive an SRS transmitted by SRS resources from a UE to determine channel conditions based on the transmission, and to make subsequent network allocation determinations based on the determined channel conditions.

The apparatus 1302 may include additional components that perform some or all of the blocks, operations, signaling, etc. of the algorithm(s) in the aforementioned flowchart(s) of FIGS. 10 and 11. As such, some or all of the blocks, operations, signaling, etc. in the aforementioned flowchart(s) of FIGS. 10 and 11 may be performed by a component and the apparatus 1302 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving, from a base station during a radio resource control (RRC) setup, in a first downlink time slot, a sounding reference signal (SRS) resource set configuration including a specified time slot offset X;
   receiving, from the base station, in a second downlink time slot after the first downlink time slot, downlink control information (DCI) including an instruction to trigger a SRS resource set;
   determining, based on the SRS resource set configuration or the DCI, a starting position within a first available time slot that follows the second downlink time slot by at least a number of time slots corresponding to the specified time slot offset X; and
   transmitting, at the starting position in the first available time slot, a reference SRS resource from the SRS resource set.

2. The method of claim 1, further comprising sequentially transmitting remaining SRS resources from the SRS resource set in one or more remaining available time slots following the first available time slot.

3. The method of claim 2, wherein the transmitting the remaining SRS resources is based on a sequential order of identifiers of the SRS resources.

4. The method of claim 2, wherein the transmitting the remaining SRS resources is based on the SRS resource set configuration or the DCI.

5. The method of claim 2, wherein the SRS resource set is aperiodic.

6. The method of claim 1, wherein the determining the starting position is based on a time domain resource assignment (TDRA) table in the received SRS resource set configuration.

7. The method of claim 1, wherein the determining the starting position of the reference SRS resource is based on a time domain resource assignment (TDRA) field in the DCI and a TDRA table configured at the UE.

8. The method of claim 7, wherein the TDRA table is allocated for physical downlink shared or physical uplink shared channels (PDSCH/PUSCH).

9. The method of claim 7, wherein the TDRA table is a separate table dedicated for use with SRS resources.

10. The method of claim 7, wherein the TDRA field is a separate TDRA field dedicated for use with SRS resources.

11. The method of claim 1, wherein the specified time slot offset X indicates a last downlink time slot prior in time to one or more available time slots for SRS transmission.

12. A method of wireless communication at a user equipment (UE), comprising:
   receiving, from a base station, in a first downlink time slot, configuration information for a sounding reference signal (SRS) resource set, the configuration information including a set of one or more t values identifying an available time slot for transmitting an SRS resource;
   receiving, from the base station, in a second downlink time slot after the first downlink time slot, downlink control information (DCI) including an SRS triggering instruction and indication of a specified t value of the set of one or more t values;
   determining a (t+1)th time slot counting from a reference time slot that follows the second downlink time slot by at least a number of time slots corresponding to the specified t value; and
   transmitting a selected reference SRS resource from the SRS resource set in the (t+1)th time slot.

13. The method of claim 12, further comprising:
   selecting a plurality of consecutive available time slots based on a time of transmission of the selected reference SRS resource; and transmitting, over the plurality of consecutive available time slots after the (t+1)th time slot, remaining SRS resources from the SRS resource set.

14. The method of claim 13, wherein the plurality of consecutive available time slots include uplink or flexible symbols for time-domain locations for all of the SRS resources in the resource set.

15. The method of claim 13, wherein the configuration information for the sounding reference signal (SRS) resource set including the (t+1)th time slot is obtained from one or both of the DCI or an earlier a radio resource control (RRC) setup.

16. The method of claim 12, wherein further comprising determining a starting position within the (t+1)th time slot based on a time domain resource assignment (TDRA) table in the received SRS configuration information.

17. The method of claim 12, wherein further comprising determining a starting position of the reference SRS resource within the (t+1)th time slot based on a time domain resource assignment (TDRA) field in the DCI and a TDRA table configured at the UE.

18. The method of claim 17, wherein the TDRA table is allocated for physical downlink shared or physical uplink shared channels (PDSCH/PUSCH).

19. The method of claim 17, wherein the TDRA table is a separate table dedicated for use with SRS resources.

20. The method of claim 17, wherein the TDRA field is a separate TDRA field dedicated for use with SRS resources.

21. An apparatus for wireless communication at a user equipment (UE), comprising:
a memory; and
at least one processor coupled to the memory and configured to:
receive, from a base station during a radio resource control (RRC) setup, in a first downlink time slot, a sounding reference signal (SRS) resource set configuration including a specified time slot offset X,
receive, from the base station, in a second downlink time slot after the first downlink time slot, downlink control information (DCI) including an instruction to trigger a SRS resource set,
determine, based on the SRS resource set configuration or the DCI, a starting position within a first available time slot that follows the second downlink time slot by at least a number of time slots corresponding to the specified time slot offset X, and
transmit, at the starting position in the first available time slot, a reference SRS resource from the SRS resource set.

22. The apparatus of claim 21, wherein the at least one processor is further configured to sequentially transmit remaining SRS resources from the SRS resource set in one or more remaining available time slots following the first available time slot.

23. The apparatus of claim 21, wherein the at least one processor is further configured to determine the starting position based on information from the received SRS resource set configuration.

24. The apparatus of claim 21, wherein the at least one processor is further configured to determine the starting position of the reference SRS resource based on a time domain resource assignment (TDRA) field in the DCI and a TDRA table configured at the UE.

25. The apparatus of claim 24, wherein the at least one processor is further configured to allocate the TDRA table for physical downlink shared or physical uplink shared channels (PDSCH/PUSCH).

26. The apparatus of claim 24, wherein the TDRA table is a separate table dedicated for use with SRS resources.

27. The apparatus of claim 24, wherein the TDRA field is a separate TDRA field dedicated for use with SRS resources.

28. An apparatus for wireless communication at a base station, comprising:
a memory; and
at least one processor coupled to the memory and configured to:
configure, during a radio resource control (RRC) setup with a user equipment (UE), a sounding reference signal (SRS) resource set having a specified time slot offset X;
transmit, to the UE, in a first downlink time slot, the SRS resource set configuration;
transmit, to the UE, in a second downlink time slot after the first downlink time slot, downlink control information (DCI) including an instruction to trigger the SRS resource set; and
receive, at a starting position in a first available time slot that follows the second downlink time slot by at least a number of time slots corresponding to the specified time slot offset X, a reference SRS resource from the SRS resource set, wherein the SRS resource set configuration or the DCI includes information identifying the starting position.

29. The apparatus of claim 28, wherein the at least one processor is further configured to determine the starting position based on the SRS resource set configuration.

30. The apparatus of claim 28, wherein the at least one processor is further configured to identify the starting position of the reference SRS resource based on a time domain resource assignment (TDRA) field included with the DCI, and a TDRA table in the received SRS resource set configuration.

31. The apparatus of claim 28, wherein the at least one processor is further configured to allocate one or both of a separate TDRA field or a separate TDRA table exclusively for SRS resources.

* * * * *